Figure 1:
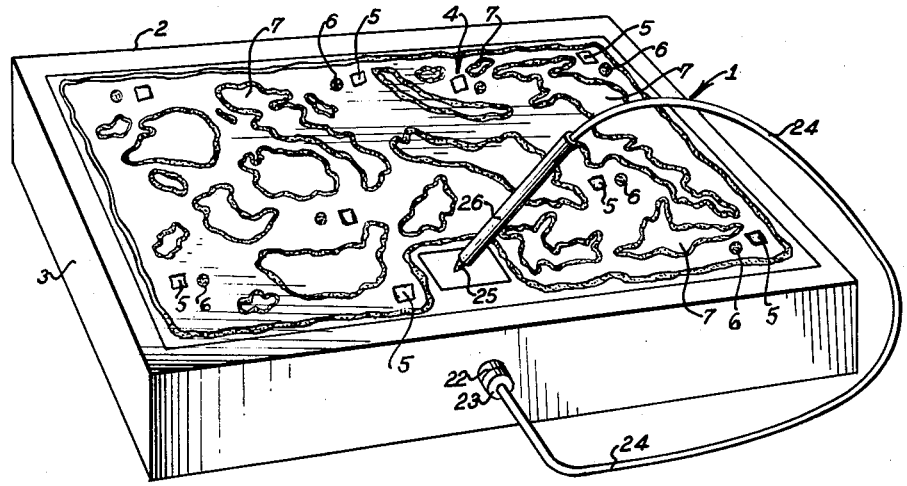

Oct. 1, 1957 W. B. GOLDFINGER ET AL 2,808,263
SIMULATED GAME
Filed Oct. 12, 1954 2 Sheets-Sheet 1

INVENTORS
WALTER B. GOLDFINGER
SEYMOUR BECKLER

BY *Smith, Michael and Gardiner,*
ATTORNEYS.

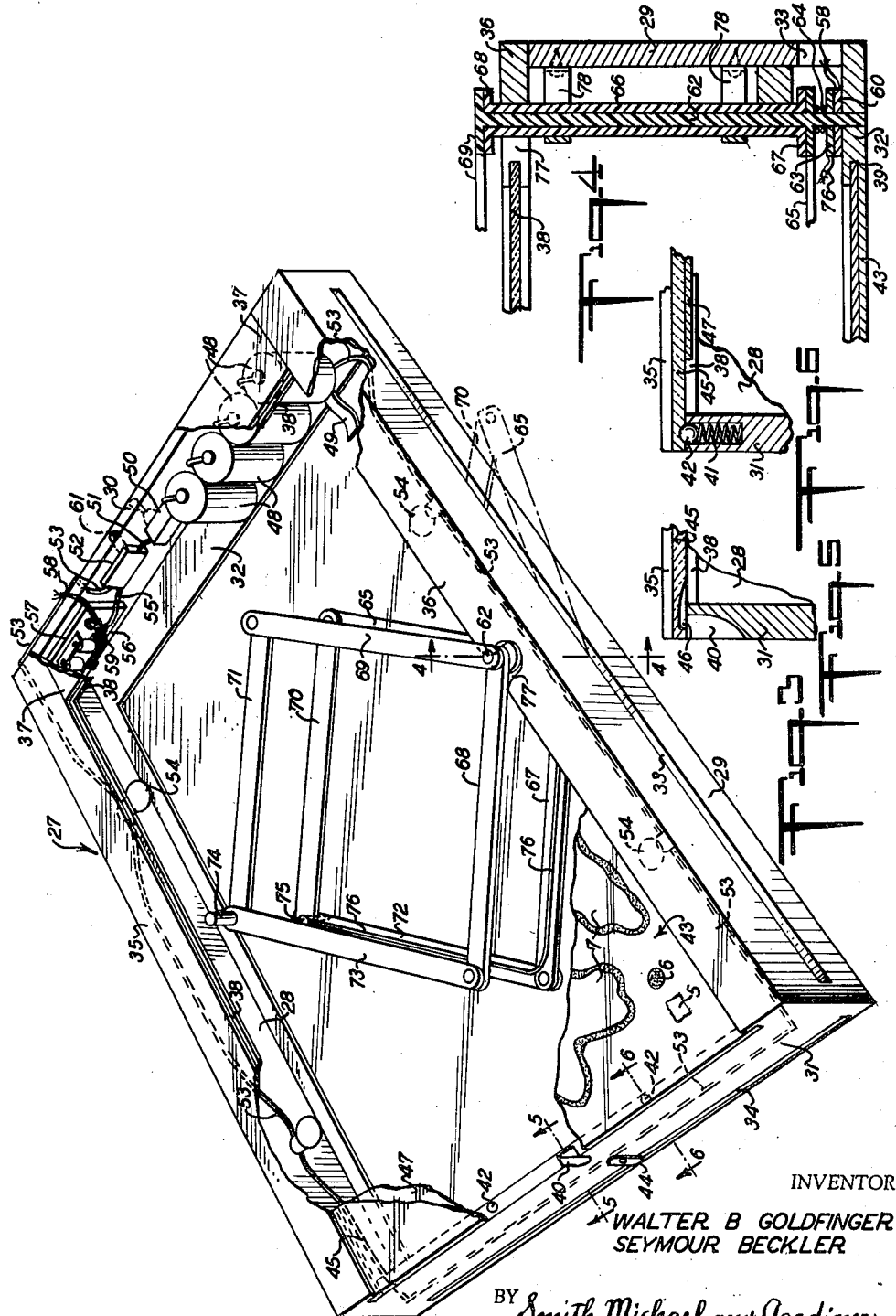

United States Patent Office 2,808,263
Patented Oct. 1, 1957

2,808,263

SIMULATED GAME

Walter B. Goldfinger, Alexandria, Va., and Seymour Beckler, Rockville, Md.

Application October 12, 1954, Serial No. 461,845

9 Claims. (Cl. 273—1)

Our present invention relates to amusement and educational devices, and has particular reference to portable structures having on a surface thereof a simulated playing field including a starting point or points, a goal or goals, and a hazard or hazards located therebetween, and a member movable over said simulated playing field from a starting point toward a goal, whereby two or more players may compete in an effort to move said member from a selected starting point to a selected goal without encountering one or more of the intervening hazards. Preferably, the simulated playing field is visible to a player at one stage of the play during which the player endeavors to memorize the exact location, direction and distance of the goal and hazards with respect to the selected starting point, following which the simulated playing field is rended invisible to the player who then attempts to move the member over the playing field from the selected starting point to the associated goal and to avoid the hazard or hazards therebetween. Hence, the devices of our present invention possess amusement and competitive features, and also possess educational features in that they serve to improve the player's observation faculties and memory as to locations, areas, directions, and distances.

It is an object of our present invention to provide amusement and educational devices which include a simulated playing field having thereon a starting point or points, a goal or goals, and a hazard or hazards therebetween, and a member movable over said simulated playing field from a starting point toward a goal, and to associate with the simulated playing field and movable member a signal means to inform the player when the movable member encounters a hazard or hazards or reaches a goal, as the movable member is moved by the player across the surface of the simulated playing field from a selected starting point to an associated goal.

It is an object of our present invention to provide portable amusement and educational devices in which a simulated playing field is formed on the surface of an electrical-conducting plate by painting, printing or otherwise depicting on said plate, by the use of electrical-insulating or non-conducting material, the various areas of the simulated playing field, certain portions of the simulated playing field, such as the goal or goals and the hazard or hazards, or the marginal boundaries of each hazard, being left uncovered by said material, whereby said underlying electrical-conducting plate is exposed at said portions.

It is an object of our present invention to provide portable amusement and educational devices which include an electrical-conducting plate having on the surface thereof conducting and non-conducting portions simulating a playing field, which plate is included in one side of an electrical circuit which circuit includes, in addition to the necessary conductors, an electrically-actuated signal, audible or visual, and to associate with said conducting plate a member movable by a player over and in contact with the surface of said plate and which includes an electrical-conducting portion connected in the other side of said electric circuit, the arrangement being such that as the said member is moved over and in contact with said surface, the electric circuit is completed to operate the signal only when the electrical-conducting portion of said member engages the conducting portions of said plate.

It is a further object of our present invention to provide a portable amusement and educational device which comprises a box-like structure the top of which may be transparent or translucent and which has depicted on the undersurface thereof a simulated playing field including a starting point or points, a goal or goals, and a hazard or hazards therebetween; to provide in spaced relation below said transparent or translucent top and within the box-like structure a second simulated playing field identical in detail with said first simulated playing field but depicted on the surface of an electrical-conducting plate having the starting point or points, the goal or goals, and the hazard or hazards, or the boundaries of said hazard or hazards uncovered or exposed and having the remainder of the surface of said plate covered with electrical-insulating or non-conducting material; to provide an electrical-conducting stylus or the like movable by a player over the surface of said conducting plate; to provide an electric circuit including a source of electricity or means for obtaining access to a source of electricity, an electrically-actuated signal of either the visual or audible type, an electric lamp or lamps located within said box-like structure below said top, one or more switches for controlling said electrical circuit, and electrical connections leading from one side of said circuit to said conducting plate and from the other side of said circuit to said conducting stylus; and to provide means for permitting the player to move said stylus over and in contact with the surface of said conducting plate, contact of said stylus with the uncovered or exposed portions of said plate completing said electrical circuit, when a controlling switch in said circuit is in its closed position, to cause actuation of said signal, the same controlling switch or a second switch in said circuit, when actuated to closed position, effecting illumination of said lamp or lamps to expose on the transparent or translucent top the simulated playing field depicted on the undersurface thereof, and actuation of said last-mentioned switch to open position extinguishing said lamp or lamps and rendering invisible the simulated playing field depicted on said undersurface of said top.

It is a still further object of our present invention to provide devices of the above mentioned character which include means by which the simulated playing field or fields may be readily removed from the box-like structure and replaced by other simulated playing fields, and to provide amusement and educational devices which are relatively cheap and easy to manufacture, which include a minimum of parts, which are strong and durable, which possess amusement, competitive and educational features and advantages, and which are highly efficient in the purpose for which designed.

Figure 2:
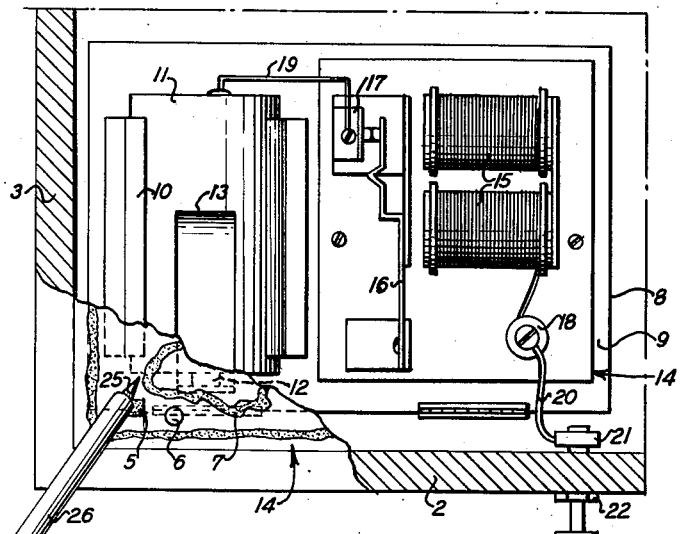

In the accompanying drawings wherein, for the purpose of illustration, we have shown several preferred embodiments of our present invention:

Fig. 1 is a perspective view of one form of our present invention,

Fig. 2 is a fragmentary plan view, partly in section, of one corner portion of the device shown in Fig. 1, Fig. 3 is a perspective view, partly in section, of a second form of the device of our present invention, Fig. 4 is a fragmentary, vertical sectional view on the line 4—4 of Fig. 3, Fig. 5 is a fragmentary, vertical sectional view on the line 5—5 of Fig. 3, and Fig. 6 is a fragmentary, vertical sectional view on the line 6—6 of Fig. 3.

Referring more in detail to the accompanying drawings, wherein like reference numerals have been employed to designate like parts throughout the several views, and referring particularly to that form of our invention shown in Figs. 1 and 2, the numeral 1 designates, broadly, a relatively shallow box-like structure including side and end members 2 and 3, respectively, a bottom member, and a top member 4, which top member comprises an electrical-conducting plate which may be permanently affixed to the top of box-like member 1 or may be removably secured thereto by screws or other fastening means.

The electrical-conducting plate 4 has depicted on the upper surface thereof a simulated playing field which, in the present instance, is shown as a field simulating a golf course including a "tee" or tees 5 constituting a starting point or points, goals or "holes" 6, hazards 7, etc., all in simulation of a more or less regular or conventional golf course. While, for the purpose of illustration, we have elected to illustrate the playing field as simulating a golf course, it is to be understood that other types of simulated playing fields may be depicted on the upper surface of plate 4, such, for example, as a simulated football field having goals at opposite ends thereof with hazards therebetween.

The simulated playing field depicted on the upper surface of plate 4 includes electrical-conducting and non-conducting portions. Goals 6 and hazards 7 or the outlines or boundaries of hazards 7, are uncovered or exposed and, hence, are electrical-conducting surfaces, while the "tees" or starting points 5 and all other portions of the surface of the plate 4 are covered with electrical-insulating or non-conducting material. The simulated playing field may be made by painting, printing or otherwise applying the non-conducting material to a surface of plate 4; the conducting portions of the simulated playing field on plate 4 may be formed by cutting out from a sheet of non-conducting or insulating material the openings adapted to overlie the conducting portions of the plate 4; or separate pieces may be cut from a sheet of non-conducting or insulating material and be so arranged on a surface of the plate as to leave portions of said surface uncovered or exposed between the separate pieces of the non-conducting or insulating material to thus provide the conducting and non-conducting portions above referred to.

In constructions in which the top plate 4 is not readily removable from the box-like structure 1 to provide ready access to the interior of said box-like structure, we provide a rectangular opening 8 in the bottom of said box-like structure, and within this opening we mount a rectangular plate or trap-door 9 which is connected along one edge thereof to said bottom by means of hinges, whereby said plate or trap-door 9 may be swung outwardly of the bottom of the box-like structure 1 to expose the accessory equipment mounted on the inner surface of said plate or trap-door, a suitable latch (not shown) being provided for normally retaining said plate or door in closed position.

On the inner face of plate or trap-door 9, we mount a resilient clip 10 for receiving between the upstanding arms thereof a dry cell, electric battery 11, the end terminal 12 of which has connected thereto, by soldering or other effective means, an L-shaped resilient conducting strip 13, which strip, when the plate or trap-door 9 is in its normal, closed position, makes electrical contact with the underside of conducting plate 4. An electric buzzer 14 of any preferred or conventional construction, is mounted on the inner face of plate or trap-door 9 adjacent the battery 11, said buzzer including the usual electro-magnets 15, armature 16, and contacts 17 and 18. An electrical conductor 19 extends between one side of the battery 11 and contact 17, and a second electrical conductor 20 extends from contact 18 to a terminal 21 of a plug-in socket 22, which socket is adapted to receive therein a plug 23 connected to one end of a flexible insulated conductor 24, the opposite end of said conductor 24 being connected with the conducting tip portion 25 of a stylus 26 preferably of insulating plastic or other non-conducting material.

When the plate or door 9 is in its normal, closed position, contact strip 13 engages the underside of plate 4 and supplies current from battery 11 to said plate, said battery also supplying current through conductor 19 to buzzer 14 and to the conducting tip 25 of stylus 26. In constructions in which the top plate 4 is readily removable, the hinged plate or trap-door 9 may be omitted and the battery 11 and buzzer 14 may be mounted directly on the upper surface of the bottom of box-like structure 1. It will be obvious that when the conducting tip 25 of stylus 26 is moved over and in contact with the surface of the simulated playing field depicted on plate 4, whenever said tip engages an uncovered, conducting portion of said plate, for example, a goal or hazard 7 or the outline or boundary of such a hazard, the electrical circuit will be completed to actuate buzzer 14 to thus inform the player that said conducting tip has encountered a conducting portion of the simulated playing field. It will also be obvious that when the conducting tip 25 is being moved over and in contact with the non-conducting or covered portion of the simulated playing field, the circuit will remain open and the buzzer will not be actuated.

Referring, now, to the construction of that form of our invention shown in Figs. 3 through 6, it will be noted that the same comprises a box-like structure 27 including side walls 28 and 29, end walls 30 and 31, and a closed bottom 32. Side wall 29 is provided with an elongated slot or opening 33, and end wall 31 is provided with an elongated slot or opening 34, the purpose of these respective slots or openings to be hereinafter described.

Side walls 28 and 29 and end wall 30 have mounted along their upper edges inwardly-extending, relatively narrow strips 35, 36 and 37, respectively, the inner edges of these three strips being grooved as indicated at 38, these grooves being coplanar with the upper edge of end wall 31. The bottom 32 of box-like structure 27 is also grooved along three of its sides as indicated at 39, these grooves being coplanar with the elongated slot or opening 34. A notch 40 is cut at the top, outer face of end wall 31 about midway between the side walls 28 and 29, and the top edge of said end wall is socketed at spaced intervals, as indicated by reference numeral 41, to receive the spring-pressed ball detents 42, the purpose of the notch 40 and of the detents 42 to be hereinafter described.

Within the box-like structure 27 and resting on the bottom 32 thereof, we place an electrical-conducting plate 43, which plate is inserted through slot or opening 34 and is moved longitudinally inwardly of the box-like structure and along the grooves 39 to a position where its inner end edge and side edges rest within the grooves 39, a latch or detent 44 being provided on the outer surface of end wall 31 and adjacent slot or opening 34 to retain plate 43 in position within the box-like structure, said latch or detent 44 being readily movable to an inoperative position to permit removal of plate 43 and substitution of another similar plate therefor.

Plate 43, like plate 4, has depicted on the upper surface thereof a simulated playing field including starting points, a goal or goals, and an intervening hazard or hazards 7, which goal or goals, hazard or hazards or the outlines or boundaries of said hazard or hazards are electrical-conducting surfaces, with the remaining portions of the surface of the plate covered with electrical-insulating or non-conducting material. Since plate 43 and the method or methods of making the same are identical with plate 4, and since the construction, functions, and operation of plate 4 have been adequately described above, further description of plate 43 appears unnecessary for the purpose of the present disclosure.

The open top of box-like structure 27, which is defined by strips 35, 36 and 37 and the upper edge of end wall 31, is adapted to be covered by a transparent or translucent plate 45 of glass or other plastic material, which plate may be readily moved into position by inserting the side edges thereof in grooves 38 of strips 35 and 36 and sliding the said plate longitudinally inwardly until its leading edge rests within the groove 38 in strip 37. The undersurface of that portion of plate 45 which overlies the top edge of end wall 31 has a notch 46 therein which overlies the notch 40 when said plate covers the top of the box-like structure 27, all as clearly illustrated in Fig. 5 of the accompanying drawings, notch 46 being readily engageable to assist in withdrawing plate 45 from its position at the top of the box-like structure 27. The edge of plate 45 containing notch 46 is also provided with one or more semi-spherical depressions located on the underside of said plate and each adapted to receive and to resiliently retain therein the ball of one of the spring-pressed detents 42, whereby said plate is resiliently retained in position.

On the underside of plate 45 is attached a thin sheet of transparent or translucent paper 47 or the like, on one surface of which is depicted, as by printing, painting or other reproductive processes, an exact duplicate of the simulated playing field appearing on plate 43. When plates 43 and 45 are in their normal positions within the box-like structure 27, each detail of the simulated playing field appearing on the paper 47, i. e. the starting points, the goals, the hazards, etc., directly overlies, in vertically-spaced relation, the same corresponding details which appear on the upper surface of plate 43. It will be obvious that the simulated playing field applied to the undersurface of plate 45 may be painted, printed or otherwise applied directly to the undersurface of said plate, thus avoiding the use of sheet 47. If plate 45 is a transparent plate, the sheet 47 on which the simulated playing field is depicted must be a translucent sheet having the simulated playing field depicted on the underside thereof, as it is essential that the simulated playing field be invisible unless a source of illumination is proivded beneath said sheet 47.

Within the box-like structure 27, preferably along one end thereof, there is mounted a plurality of dry cell, electric batteries 48, which batteries are connected in series and constitute a source of electric current for operating accessories to be hereinafter described. One side of the circuit from batteries 48 includes a resilient contact member 49, which, when electrical conducting plate 43 occupies its normal position within the box-like structure 27, establishes electrical contact between batteries 48 and plate 43. The other side of the circuit from batteries 48 may be connected to a main control switch 50 by means of which the entire electrical circuit is controlled. A conductor 51 leads from switch 50 to a double contact, spring-pressed switch 52, one lead 53 from which leads to a circuit including lamps 54, the opposite end of which circuit is connected to batteries 48, and a second lead 55 from which leads to contact 56 of a buzzer 57 of any preferred or conventional construction. A conductor 58 leads from contact 59 of buzzer 57 to a fixed contact 60 to be described in detail hereinafter. Double contact switch 52 includes a movable contact member which is spring-biased to normally maintain such contact member in a position such that the circuit from switch 50 leads, through conductor 55, to contact 56 of the buzzer 57 and no current flows through conductor 53 to the circuit which includes the lamps 54. Switch 52 may be actuated by means of a push button 61 to move the movable contact of said switch to interrupt the buzzer circuit and to establish the flow of current through conductor 53 to the lamp circuit to illuminate the lamps 54, which lamps will remain illuminated until release of the push button 61, whereupon the movable contact of switch 52 will open the lamp circuit and will reestablish the circuit from switch 52 through conductor 55 to buzzer 57.

Conductor 58 leads to a fixed contact 60 which contact may be in the form of an apertured disk resting on the bottom 32 of the box-like structure 27, which apertured disk surrounds a shaft 62, the lower end of which shaft is journalled in a cylindrical passage or bore in the bottom 32. Immediately overlying fixed contact 60 is a second contact 63 also in the form of an apertured disk surrounding shaft 62. Contact 63 is free to partake of limited axial movement along the lower portion of shaft 62, being urged downwardly into relatively firm surface engagement with fixed contact 60 by means of a compression spring 64 which surrounds shaft 62 and which is positioned between the upper face of contact 63 and the lower face of an arm 65, said arm having its inner end keyed or otherwise secured to shaft 62 to oscillate therewith. Surrounding shaft 62 above arm 65 is a tubular sleeve 66, to the lower end of which is secured the inner end of an arm 67 and to the upper end of which is secured the inner end of an arm 68, the arrangement being such that angular movement of arm 68 fixed to tubular sleeve 66 will cause corresponding angular movement of arm 67. The upper end of shaft 62 has secured thereto the inner end of an arm 69 which inner end is keyed or otherwise secured to shaft 62 to oscillate therewith, whereby angular movement of arm 69 will cause corresponding angular movement of arm 65. The outer ends of arms 65, 69, 67 and 68 have pivotally attached thereto the inner ends of arms 70, 71, 72 and 73, respectively, the outer ends of arms 70 and 72 and the outer ends of arms 71 and 73 being pivotally connected as clearly shown in Fig. 3 of the accompanying drawings. The pivotal connection between the outer ends of arms 71 and 73 includes an upwardly extending pin or handle 74, while the pivotal connection between the outer ends of arms 70 and 72 includes an electrical conducting pin or stylus 75. An electrical conductor 76 extends from contact 63, along arms 67 and 72 to conducting pin or stylus 75, whereby current may pass through conductor 58, contact 60, contact 63, conductor 76, to said pin or stylus 75.

Shaft 62, tubular sleeve 66, and their associated parts may be conveniently and securely mounted in position within box-like structure 27, by providing a U-shaped notch 77 in the inner edge of strip 36 about midway of the length thereof, said notch overlying the cylindrical passage or bore in the bottom 32 adapted to receive the lower end of shaft 62. When shaft 62, sleeve 66 and their associated parts are placed in the position shown in Fig. 4, with the lower end of shaft 62 positioned within the cylindrical passage or bore in bottom 32 and the upper end of sleeve 66 positioned within notch 77, with arms 68, 69, 71 and 73 overlying the upper surface of the box-like structure, a pair of U-shaped clamping members 78 attached to the inner face of side wall 29 function to retain the said shaft 62, sleeve 66, and their associated parts in position.

It will be obvious that arms 68, 69, 71 and 73 constitute the upper member of a double pantograph, while arms 65, 67, 70 and 72 constitute the lower member of the same pantograph. Any movement of said upper member effected through movement of pin or handle 74 over the upper surface of the plate 45 will cause a corresponding movement of said lower member by virtue of the construction and mounting of the double pantograph above described, it being noted that during certain portions of the movement of the aforesaid double pantograph the arms 65 and 70 or the arms 67 and 72 are free to move outwardly of the box-like structure 27 through elongated slot or opening 33, as indicated, for example, in dotted lines in Fig. 3.

Having thus described the construction of several preferred embodiments of our present invention, we will now refer to the manner of using these amusement and educational devices. Referring, first, to the use of that form of our invention shown in Figs. 1 and 2, and assuming that the battery 11, buzzer 14, conductor 24 and stylus 26 have been arranged in the manner above described, and assuming, further, that conducting plate 4 has been secured in position at the top of box-like structure 1 with contact strip 13 engaging the lower surface of said plate, a player places the conducting point 25 of stylus 26 on one of the simulated "tees" 5. Since the simulated "tees" or starting points 5 are of insulating or non-conducting material, the electrical circuit is not completed and no signal is given by buzzer 14. The player then studies the simulated playing field and endeavors to the best of his ability to memorize the distance and direction from the "tee" 5 to its remotely situated associated "hole" or goal, as well as the location of any and all hazards located therebetween. He then closes or covers his eyes or looks away from the simulated playing field and endeavors to move stylus 26 from the selected "tee" or starting point 5 toward its associated goal and to avoid the intervening hazards while so doing. If, during such movement, the conducting point 25 of stylus 26 encounters the conducting, non-insulated boundary of one of the hazards 7, the electrical circuit will be completed and the buzzer will be actuated to inform the player that he has encountered a hazard, thus costing him one "stroke" in the simulated game of golf. When the buzzer is actuated, the player again views the simulated playing field and moves the contact point 25 off of the conducting surface to a closely adjacent point on the covered or non-conducting surface. He then endeavors to memorize the location and direction of the "hole" or goal toward which he is playing and the location of any and all intervening hazards, after which he again closes or covers his eyes or looks away from the simulated playing field and again moves the stylus 26 toward the selected "hole" or goal. This is continued until the conducting stylus reaches the selected "hole" or goal whereupon the buzzer is again actuated, a record being kept of the number of hazards encountered while the stylus is being moved from a selected "tee" to its associated "hole" or goal. If the player moves the stylus 26 from a "tee" to its associated "hole" without encountering any of the intervening hazards, the buzzer 14 will be actuated when the conducting point 25 contacts the conducting or non-insulated portion 6. The object of the game is, of course, to "play" the nine or eighteen "holes" of the simulated golf game with the minimum number of "strokes," i. e. by encountering the minimum number of hazards, the player's score being kept in accordance with the scoring methods of a conventional golf game. It will be obvious that a player's ability to successfully play the game is largely dependent upon his ability to memorize the locations, distances and directions of the elements of the simulated playing field to thus be able to go from "tee" or starting point to "hole" or goal without encountering the intervening hazards. The simulated playing field is changed occasionally, i. e. a new simulated playing field is substituted therefor on which new field the location of starting points, hazards and goals is different from the previously-used simulated playing field, so that a player who has previously played the game will not have an unfair advantage over an opponent who has not previously played the game.

The form of our invention shown in Figs. 3 through 6 embodies the same general rules or manner of play as described above in connection with Figs. 1 and 2, the principal difference being that in the form of our invention shown in Figs. 3 through 6, it is unnecessary for a player to close or cover his eyes or to look away from the device when playing the simulated game. Assuming that the batteries 48, switches 50 and 52, buzzer 57, lamps 54, contact plates 60 and 63, contact point 75 and their respective electrical connections have been arranged in the manner above described, and assuming, further, that conducting plate 43 and transparent or translucent plate 45 have been secured in their respective positions and with spring contact 49 engaging conducting plate 43, switch 50 is closed and push-button 61 of double-contact switch 52 is actuated to interrupt the circuit to buzzer 57 and to complete the circuit to lamps 54, whereupon the simulated playing field appearing on sheet 47 becomes visible through transparent or translucent plate 45. Push-button 61 is held in lamp-circuit closing position until the player believes he has memorized the location, distance and direction of the hazards and "hole" or goals, after which push-button 61 is released to interrupt the lamp circuit and to reestablish the circuit from batteries 48 to buzzer 57. The player, who has previously moved pin or handle 74 to a position over one of the simulated "tees" or starting points, then does his best to move said pin or handle toward the "hole" or goal associated with that particular "tee" and to avoid, when so doing, moving said pin or handle over a location on the transparent or translucent plate 45 where a hazard or hazards appeared. It will be apparent that by virtue of the double pantograph arrangement which we have provided, any and all movements of pin or handle 74 will result in corresponding movements of contact pin 75 over and in contact with the surface of conducting plate 43, and that when said contact pin engeges a conducting or non-insulated portion of plate 43, i. e. a goal 6, a hazard 7 or the boundary of a hazard 7, the circuit to buzzer 57 will be completed and said buzzer will inform the player that he has reached a "hole" or goal or that he has encountered a hazard. When the buzzer sounds, the player actuates push-button 61 to again energize the circuit to lamps 54 and to interrupt the circuit to the buzzer 57, whereupon the player may ascertain whether the actuation of the buzzer was caused by contact of the conducting point 75 with a "hole" or goal, in which case he moves the pin or handle 74 to a closely adjacent "tee" 5 on the covered or non-conducting surface, or was caused by contact of said conducting point 75 with the conducting boundary of a hazard 7, in which case he moves the pin or handle 74 to a closely adjacent point on the covered or non-conducting surface. While the lamps 54 are thus energized and the simulated field depicted on sheet 47 is again rendered visible on transparent or translucent plate 45, the player endeavors to memorize the distance, location and direction of the "hole" or goal with respect to the point on the "field" where his "play" was stopped, following which push-button 61 is released, the lamp circuit is interrupted, and the buzzer circuit is reestablished. The player then moves the pin or handle 74 toward the "hole" or goal toward which he was "shooting" until conducting pin 75 again engages a conducting or non-insulated portion of plate 43. As was explained in connection with the operation of the form of our invention shown in Figs. 1 and 2, the object of the game is to "play" the simulated golf game with a minimum number of "strokes."

When it is desired to change the simulated playing field associated with plate 45, it is only necessary to engage the notch 46 on the underside of the forward edge of plate 45 and to slide the said plate outwardly along grooves 38 on the inner edges of strips 35 and 36, sufficient pressure being exerted to depress the spring-pressed ball detents 42. A new sheet 47 is then applied to the undersurface of plate 45 and said plate and new sheet are again inserted to constitute the top of box-like structure 27. Latch 44 is operated to clear slot 34, whereupon conducting plate 43 may be readily removed from the bottom of said box-like structure by sliding said plate outwardly through slot 34 and along grooves 39. A new conducting plate 43 is then inserted through slot 34 and moved inwardly along grooves 39 to a position where said new plate is completely within the box-like structure and spring contact member 49 engages a conducting portion of said new plate, whereupon latch 44 is moved to a position where it blocks slot 34 to retain new plate 43 in position. It will be understood that the simulated playing field depicted on conducting one plate 43 is identical in so far as relates to starting points, hazards, goals, etc., with the simulated playing field depicted on sheet 47, and that when plate 45 and plate 43 are in their normal positions, each detail of the simulated playing field depicted on sheet 47 directly overlies, in vertical spaced relation, a corresponding detail of the simulated playing field depicted on conducting plate 43.

It is to be definitely understood that the several forms of our present invention shown and described herein are to be taken as preferred embodiments thereof, and that various changes may be made in the shape, size and arrangement of parts without departing from the spirit of our invention or from the scope of the subjoined claims. While we have elected herein to illustrate and describe our invention as comprising a self contained portable unit, it will be obvious that the electric current necessary for operation of the buzzers and/or lamps may be obtained from a plug type connector adapted for connection with an ordinary house-current outlet box. The use of a playing field in simulation of a golf course, is not an essential feature of our present invention, it being well within the scope of our invention to use playing fields in simulation of other games of competitive sports where starting points, goals and intervening hazards or obstacles are involved. While we have elected herein to illustrate the playing field depicted on a flat or plane surface, it is obvious that this is not essential, and that the surface may be formed in relief to more accurately depict the contours or other details of an actual playing field. The use of a buzzer, while preferred in the form of our invention shown in Figs. 1 and 2, is not essential, it being obvious that a visual signal might well be employed as a substitute for the audible signal shown and described herein. While we have illustrated and described the shaft 62 and its surrounding sleeve 66 as being mounted at one side of the box-like structure 27, such location is not essential, as said shaft and its surrounding parts might well be located at any point within or adjacent the sides or ends of the box-like structure. Other changes will readily suggest themselves to anyone skilled in the art to which our present invention relates.

Having thus described our invention, we claim:

1. A game device adapted to amuse and train the observation and memory faculties of its players comprising, in combination, a portable structure; a simulated playing field supported on said structure; a hand-guided, electrical conducting member movable freely in a continuous path over the entire area of said playing field in any direction; an electric circuit including a source of electricity and an electric signal device in said circuit; said playing field including wide insulating areas which are open to each other so as to form a continuous though tortuous traversable path; other portions of said playing field having spaced-apart conducting areas providing simulated hazards or obstructions; conductors in said circuit connecting said hand-guided, electrical conducting member and also said spaced-apart conducting areas with said source of electricity; a starting point marked on said playing field which is not at any time in said circuit; a goal or finished point which is a conductor connected in said circuit but not connected to any of said spaced-apart conducting areas and located on said playing field at a point distant from said starting point; the spaced-apart conducting areas that provide the simulated hazards or obstructions being between the starting and finish points and making a complex, difficultly memorized pattern of obstructions which must be evaded by the hand-guided conducting member as it traverses the playing field from the starting to the finish points.

2. An amusement and educational device comprising a portable box-like structure having an open top; an electrical-conducting plate covering said open top and having on its upper surface a simulated playing field which covers substantially its entire area; parts of said simulated playing field being conductive of electricity and other parts being insulative; an electrical-conducting member freely movable by hand over all parts of said surface in physical contact therewith; a normally closed trap-door hingedly mounted in an opening in a wall of said box-like structure; an electric battery mounted on the inner surface of said trap-door; a buzzer mounted on the inner surface of said trap-door; a spring contact member extending from one contact of said battery to engage said electrical conducting plate when said trap-door is in its normal closed position; a conductor leading from the other terminal of said battery to one terminal of said buzzer; and a conductor leading from the other terminal of said buzzer to said electrical-conducting member whereby said buzzer is operated only when said movable conducting member engages the conductive portions of said playing field.

3. The invention defined in claim 1, wherein the portable structure is box-like, and housed within the box-like structure are a battery providing the source of electricity, and a buzzer providing the signal device connected to the battery; said hand-guided conducting member being a stylus connected by a conductor to the buzzer, said stylus being contactable with the playing field to traverse the path determined by the player; said playing field being a conductor of electricity with insulating material attached thereto to form said continuous traversable path for said stylus, and means connecting said playing field with said battery.

4. The invention defined in claim 1, wherein the playing field simulates a golf course, having a plurality of starting points or tees, a plurality of finish points or cups, and all the spaced-apart conducting areas simulate golf course hazards such as would impede or obstruct free movement of a ball from tee to cup, there being a plurality of such hazards between each tee and its corresponding cup.

5. The invention defined in claim 1, wherein the portable structure is box-like, and the playing field covers nearly the entire top of the box-like structure and is a flat plate made of conducting material over which the hand-guided electric conducting member may freely move, the insulating areas being provided by insulating material attached to the upper surface of said flat plate.

6. The invention defined in claim 1, wherein the portable structure is a rectangular frame to which the simulated playing field is rigidly attached, with the frame enclosing the playing field; the playing field being readily removable for replacement by other simulated playing fields of identical construction but of different designs of insulating and conducting areas and starting and finish points.

7. The invention defined in claim 1, wherein the portable structure is box-like with an open top; a translucent plate is supported in said top and has a simulated playing field depicted on the underside thereof, said simulated playing field being invisible from above except when light is thrown on the simulated playing field from below; a second simulated playing field duplicating the field design of the first mentioned simulated playing field but located entirely inside the box-like structure and comprising an electrical conducting plate having conducting areas on its upper surface which form a part of the field design and other areas also a part of the field design which are insulative; the second simulated playing field having each element of its design directly below the corresponding design element of the first-mentioned playing field; a stylus freely movable by hand over the surface of said translucent plate; a double pantograph connnecting the hand-guided electrical-conducting member with said stylus; an electric circuit including a source of electricity having one side connected to said conducting plate and the other side connected to said hand-guided electrical-conducting member; an electric lamp below said translucent plate and in said circuit; an electric signal in said circuit which is operated only when said hand-guided electrical-conducting member engages the conducting portions of said conducting plate; and control means in said circuit for selectively illuminating said electric lamp to make the first-mentioned simulated playing field visible and for opening and closing the circuit to said electric signal.

8. The invention defined in claim 7, wherein the two playing fields simulate the same golf course, having a plurality of starting points or tees, a plurality of finish points or cups, and all the spaced-apart conducting areas simulate hazards on a golf course such as would impede free movement of a ball from tee to cup, there being a plurality of such hazards between each tee and its corresponding cup.

9. The invention defined in claim 7, wherein the box-like structure has means slidably supporting the translucent plate and there are means on the box-like structure cooperating with complemental means on said plate to latch the translucent plate in playing position on the box-like structure; the plate of the second-mentioned simulated playing field being insertible and removable through a slot provided in one side of the box-like structure, and a latch being provided to retain the last-mentioned plate in position within said structure; both said simulated playing fields being removable for replacement by like playing fields of a different design.

References Cited in the file of this patent

UNITED STATES PATENTS 2,521,500    Braund _____ Sept. 5, 1950

FOREIGN PATENTS 318,627    Germany _____ Nov. 7, 1918
574,465    Great Britain _____ Jan. 7, 1946